(12) United States Patent
Volpi (10) Patent No.: US 6,470,933 B1
(45) Date of Patent: Oct. 29, 2002

(54) TIRE CONTAINING AT LEAST PART OF AN ELECTRICAL CURRENT GENERATOR INTENDED FOR THE SUPPLY OF SENSORS AND/OR OTHER ELECTRICAL DEVICES PRESENT WITHIN THE TIRE, AND METHOD FOR MANUFACTURE THE SAID TIRE

(75) Inventor: Alessandro Volpi, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/263,500

(22) Filed: Mar. 8, 1999

Related U.S. Application Data
(60) Provisional application No. 60/086,508, filed on May 22, 1998.

(30) Foreign Application Priority Data

Mar. 9, 1998 (EP) ............................................. 98830122

(51) Int. Cl.⁷ ......................... B60C 15/00; B60C 15/04; B60C 15/05; B60C 19/00; B29D 30/48

(52) U.S. Cl. .................... 152/152.1; 152/539; 152/540; 152/547; 245/1.5; 156/130.7; 156/131; 156/136

(58) Field of Search .............................. 152/152.1, 539, 152/540, 547; 156/136, 131, 130.7; 245/1.5

(56) References Cited

U.S. PATENT DOCUMENTS

| 1,767,772 A | * | 6/1930 | Pierce |  |
| 2,475,199 A | * | 7/1949 | Reynolds | 152/152.1 |
| 2,983,299 A | * | 5/1961 | Jenkins |  |
| 3,662,335 A | * | 5/1972 | Fritze | 152/152.1 |

(List continued on next page.)

FOREIGN PATENT DOCUMENTS

| DE | 3410214 A1 |   | 10/1985 |
| DE | 19648318 A1 |   | 5/1998 |
| DE | 19651063 A1 |   | 6/1998 |
| EP | 0 433 974 A2 |   | 6/1991 |
| EP | 875705 | * | 11/1998 |
| JP | 3-273912 | * | 12/1991 |
| JP | 8-310207 | * | 11/1996 |
| WO | 90/12474 |   | 10/1990 |

OTHER PUBLICATIONS

Mark et al, Science and Technology of Rubber, pp. 678–680, 1994.*
Blow, Rubber Technology and Manufacture, pp. 345–356, 1971.*
Patent Abstracts of Japan; vol. 097, n. 003, Mar. 31, 1997; Pub. No. 08 310207.
Patent Abstracts of Japan; vol. 016, n. 094, Mar. 09, 1992; Pub. No. 03 273912.
Derwent Abstract of DE 19648318 A1.
Derwent Abstract of DE 3410214 A1.
Derwent Abstract of DE 19651063 A1.

*Primary Examiner*—Steven D. Maki
(74) *Attorney, Agent, or Firm*—Finnegan, Henderson, Farabow, Garrett & Dunner LLP (57) ABSTRACT

A tire for a vehicle wheel includes a toroidal carcass, a tread band, and a first inductive element of an electrical generator. At least one tire bead includes an annular core including a steel strip spirally wound to form at least two radially-superposed layers. The first inductive element includes at least one turn of conducting wire wound around a transverse profile of one of the annular cores. Alternatively, at least one tire bead includes an annular core including a matrix based on an elastomeric or plastomeric material, the matrix incorporating fibers, yarn, or cords, and containing ferromagnetic material in at least one of a powder form or a fibril form. The tire may include at least one electronic circuit operatively coupled to the first inductive element. A system for sensing and signaling one or more parameters associated with the tire and a method for producing the tire are also disclosed.

47 Claims, 5 Drawing Sheets

U.S. PATENT DOCUMENTS

| | | |
|---|---|---|
| 4,006,449 A | 2/1977 | Sumi |
| 4,163,208 A | 7/1979 | Merz |
| 4,717,905 A | 1/1988 | Morrison, Jr. et al. |
| 4,911,217 A * | 3/1990 | Dunn et al. ............... 152/152.1 |
| 5,181,975 A | 1/1993 | Pollack et al. |
| 5,215,613 A * | 6/1993 | Shemenski et al. ......... 156/136 |
| 5,325,902 A | 7/1994 | Loewe et al. |
| 5,505,080 A * | 4/1996 | McGhee .................... 73/146.5 |
| 5,573,610 A * | 11/1996 | Koch et al. ............... 152/152.1 |
| 5,749,984 A * | 5/1998 | Frey et al. ............... 152/152.1 |

\* cited by examiner

TIRE CONTAINING AT LEAST PART OF AN ELECTRICAL CURRENT GENERATOR INTENDED FOR THE SUPPLY OF SENSORS AND/OR OTHER ELECTRICAL DEVICES PRESENT WITHIN THE TIRE, AND METHOD FOR MANUFACTURE THE SAID TIRE

CROSS-REFERENCE TO RELATED APPLICATIONS

Applicant claims the right of priority under 35 U.S.C. §119(a)–(d) based on patent application No. 98830122.2, filed Mar. 9, 1998, in the European Patent Office; additionally, Applicant claims the benefit under 35 U.S.C. §119(e) based on prior-filed, co-pending provisional application No. 60/086,508, filed May 22, 1998, in the U.S. Patent and Trademark Office.

BACKGROUND OF THE INVENTION

1. Field of the Invention

The present invention relates to a tire for use on motor vehicles, trailers, motorcycles, aircraft or similar (referred to generally as "vehicles" in the following text), provided with an electricity generator which can supply sensors and any other circuits incorporated in the said tire, the generator having no galvanic contact with fixed or rotating components present in the vehicle. In particular, the invention relates to a tire in which the unit formed by one part of the generator, the sensors and the bead wire constitutes an assembly to be incorporated in the carcass of the tire during its manufacture.

The invention also relates to a method for the manufacture of the said tire.

2. Description of the Related Art

The structure of an ordinary tire essentially comprises a carcass provided with at least one piece of reinforcing rubberized fabric, or carcass ply, each of whose edges is fixed to at least one circumferentially inextensible annular metal core, commonly known as the bead core, which is the reinforcing member which keeps the tire on its mounting rim. The carcass is completed by a pair of sidewalls, in axially opposing positions, and a tread strip disposed on the crown of the casing and impressed with a relief pattern which imparts to the tire particular qualities of behaviour in use. The tire can also be provided with a belt structure, normally produced with rubberized fabrics incorporating metal reinforcing cords, interposed between the carcass and the tread band.

Circuits comprising encoders and/or sensors, connected to transponders (which receive signals and transmit responses), supplied by induction, and housed within vehicle tires or wheels, have been known for some time.

For example, patent application WO 90/12474, having the title "Vehicle tire identification system", describes a system consisting of a transponder located within a tire, supplied by a winding disposed in the crown portion of the tire, or at least situated in a position remote from the bead cores of the said tire (p. 5, lines 20–22).

This winding is supplied by induction with an alternating current of suitable frequency by means of a large excitation winding which is disposed outside the tire and carried by a scanning tool such as a bar, or located in a fixed place, for example in the road surface, and which is brought close to the equator of the tire where the said transponder supply winding is housed.

In the absence of information on this matter, the applicant considers that this arrangement remote from the bead cores is due to the necessity of preventing the reduction of the efficiency of the winding by parasitic currents which would be generated in the bead core by the inductive coupling between the bead core and a winding disposed in its vicinity. An advantage of the system described is the fact that the transponder supply winding, because of its dimensions, operates even if the winding of the scanning tool is not disposed in its immediate vicinity, whereas the latter arrangement is necessary if the supply winding has a small diameter and is situated in a closely defined point of the crown or of the sidewall of the tire.

However, the device proposed in patent application WO 90/12474 has at least the following drawbacks:

a) it requires transponder supply windings positioned close to the equator of the cover, in other words just under the tread band or in its immediate vicinity, to minimize the losses of efficiency of the said windings due to the presence of the bead cores. This greatly complicates the tire production process and has the further disadvantage of potential structural problems due to the presence of the winding in a part of the tire subject to considerable stresses and deformations when in use;

b) it necessitates the installation of the device using the power generated by the winding in the same highly mechanically stressed part of the cover where the winding is located, or, alternatively, the incorporation in the tire sidewall structure of electrodes to transfer the said power to a more suitable position for its use.

Another example is provided by U.S. Pat. No. 5,181,975, which describes a transponder supplied by a winding which is situated in the bead of the cover, and is separate from the bead core but inductively coupled to the bead core; the currents induced in the bead core by an external magnetic field which varies in a sinusoidal way induce, in turn, voltages in the transponder supply winding.

This location of the secondary winding (inductive antenna), like the location in the crown described previously, offers the advantage of always having a good inductive coupling to the primary winding (transmitter). However, this solution also presents problems in respect of both the mechanical characteristics of the tire (with a substantially inextensible turn housed in a particularly complex and partially deformable structural area, namely the bead area) and its manufacturing process.

U.S. Pat. No. 4,006,449, having the title "Information detector for a tire wheel", describes a system of supplying a sensor of tire operating parameters, such as internal pressure and/or temperature, consisting of a winding comprising a specified number of turns located on the edge of the rim in a radially inward position with respect to the axis of rotation of the wheel.

The winding is connected to a passive transducer (the sensor) which communicates with the interior of the tire, being located in the sealing cap of the air filling valve of the said tire. The said circuit receives an excitation signal induced by a first coil fixed to the chassis of the vehicle and connected to an alternating current source which is also fixed to the vehicle; the impedance of the said coil depends on the passive transducer, since the latter affects the strength and/or phase of the excitation signal.

A second fixed coil, inductively coupled to the turns of the rotating winding, senses the said variations of amplitude and/or phase and is connected to a circuit for processing the sensed signals, which controls both an indicator of the sensed values and any provided alarm devices which are activated in the presence of anomalous values of the parameters, such as a loss of pressure in the tire due to a puncture or fault in it.

This system would behave in a fairly satisfactory way, producing on the dashboard of a vehicle reliable information on the operation of the tires, combined with warnings of dangers due to anomalous situations, if it did not have an intrinsic weakness consisting in the flexible connections between the circular winding located on the rim and the transducer located within the cap of the air filling valve. These connections, being affected both by the centrifugal stresses caused by the rotation of the wheel and by the stresses due to the inevitable impacts of the wheel against accidental obstacles (when running over broken ground, pavements, etc.), are subject to frequent rupture.

U.S. Pat. No. 4,717,905, having the title "Warning system including means for remotely energizing condition sensing device", describes a system for remotely supplying at radio frequency one or more devices for sensing state conditions, such as the internal conditions of tires, wherein a radio signal generated by a radio-frequency source is received by a circular coil antenna installed on the rim of the wheel of a vehicle and is used to supply one or more transducers of physical values, for example pressure, connected to the antenna. The transducer varies the resonant frequency of the oscillating circuit comprising the antenna installed on the rim as a function of the value of the physical quantity which is being monitored; the variation of the resonant frequency is sensed by circuits associated with the radio-frequency generator and can then be used to control instruments and alarms on the dashboard of the vehicle.

The principal disadvantages of the described system are inherent in the geometrical and mechanical design of the system: the coil antenna mounted on the rim has to be electrically connected to the sensors incorporated in the tire, with the usual problems related to the low reliability of connectors which have to be incorporated in parts subject to large deformations, such as the structural components of tires.

The examination of the prior art as described above reveals that there is not yet available a simple and reliable electricity generator which is capable of supplying sensors of operating parameters of the tire or other devices and which does not use electrical connections, particularly those with equipment fixed outside the tire, with all the problems associated with them.

SUMMARY OF THE INVENTION

The applicant has now discovered that the bead cores of tires, being structural components which are always present both in tires with radial carcass and in those with conventional carcass, can be used advantageously as the core of a secondary inductive element. In particular, bead wires are usually made from steel wire or strip, in other words from ferromagnetic material and are therefore suitable for use as the core of a secondary inductive element. Furthermore, their magnetic permeability may be increased if necessary by the addition of suitable materials capable of increasing the linked magnetic flux.

The applicant has also discovered the use, as a primary inductive element, of a magnet or an electromagnet which is advantageously fixed to a support which is mounted on the hub of the wheel and is therefore in a fixed position.

The applicant has further discovered that the user circuits may also advantageously be mounted, with the secondary inductive element, on a structural member which is substantially free of large deformations, such as the reinforcing bead core of the bead.

The bead core is in fact the least deformable structural member of the tire and is therefore well suited for use as the base for mounting electronic devices for sensing and transmitting signals, these devices, owing to their rigidity, fragility and sensitivity, not being generally suitable for inclusion in elastomeric components subject to large deformations.

In a first aspect, the present invention relates to a tire for vehicle wheels, comprising a toroidal carcass provided with axially opposing sidewalls terminating in beads for fixing the said tire to a corresponding mounting rim, each of the said beads being provided with a reinforcing annular core, a tread band disposed on the crown of the said carcass and axially extending continuously between the said sidewalls, characterized in that at least one of the said annular cores is used as a ferromagnetic core and at least one turn of conducting wire is wound around the transverse profile of the said annular core to form a secondary inductive element of an electricity generator.

According to the invention, the said secondary inductive element can be associated with at least one primary inductive element to form the said electricity generator, the said primary inductive element and the said secondary inductive element being movable with respect to each other.

Preferably, the said annular core comprises a layer of material with high magnetic permeability. In an alternative embodiment, the said annular core comprises a plurality of blocks of material with high magnetic permeability.

In a different preferred embodiment, the said annular core is made from steel and comprises a matrix of the elastomer or plastomer type, either thermoplastic or thermosetting, containing soft ferromagnetic material in powder form.

Preferably, the said tire comprises electronic circuits supplied from the said secondary inductive element.

More preferably, the said electronic circuits comprise means for sensing certain parameters of the tire. In particular, the said electronic circuits are fixed to the said annular core.

Preferably, the said sensing means comprise at least one temperature sensor and/or at least one pressure sensor and/or a pair of extensometers, disposed in two orthogonal directions, which sense the deformations of the said annular core.

In particular, the said electronic circuits comprise data transmission means capable of transmitting the said parameters of the tire.

In another different aspect, the present invention relates to a system for sensing and signalling parameters of the physical state of a tire for vehicle wheels, mounted on a corresponding mounting rim, comprising a tire having a toroidal carcass provided with axially opposing sidewalls terminating in beads for fixing the said tire to the said rim, each of the said beads being provided with a reinforcing annular core, a tread band disposed on the crown of the said carcass and axially extending continuously between the said sidewalls, a device for sensing the said parameters of the physical state of a tire, and an electricity generator for the supply of the said sensing device, characterized in that at least one of the said annular cores is used as a ferromagnetic core and at least one turn of conducting wire is wound around the transverse profile of the said annular core to form a secondary inductive element of the said electricity generator.

Preferably, the said secondary inductive element can be associated with at least one primary inductive element to form the said electricity generator, the said primary inductive element and the said secondary inductive element being movable with respect to each other.

According to a preferred embodiment, the said primary inductive element comprises at least one permanent magnet. In an alternative form, the said primary inductive element comprises at least one electromagnet and at least one second turn of electrically conducting wire wound around the transverse profile of the said at least one electromagnet to form at least one primary winding of the said electricity generator.

In particular, the said electromagnet is supplied with direct current, or with alternating current, or with direct current and with alternating current.

In another different aspect, the present invention relates to a method for producing a tire, comprising the following steps:

producing on the preparation machines the semi-finished products required for building a tire, comprising a pair of ferromagnetic annular elements for fixing the said tire to a corresponding mounting rim;

forming a first secondary winding of an electricity generator, by disposing on at least one annular core of the said pair, called the annular coil element, at least one first turn of electrically conducting wire, wound around the transverse profile of the said annular coil core, and assembling the said semi-finished products on tire building machines to form a green carcass for the said tire, comprising at least one annular coil core.

Preferably the step of forming the said first secondary winding comprises the step of fixing means for sensing certain physical parameters of the tire, supplied from the said power generator, to the said annular coil core.

In particular, the step of disposing a layer of material with high magnetic permeability on the circumference of the said at least one annular core while it is without the said one turn is carried out before the step of forming a first secondary winding.

In another different aspect, the present invention relates to a method for generating an electrical current within a tire for the supply of at least one electronic device, comprising the stage of inducing a variable magnetic field in a winding formed by at least one turn wound around a bead core belonging to the said tire.

BRIEF DESCRIPTION OF THE DRAWINGS

The present invention will be described below, solely by way of example and without restriction, with reference to some preferred embodiments, as shown by way of example in the attached figures, in which.

DETAILED DESCRIPTION OF THE PREFERRED EMBODIMENTS

Figure 1:
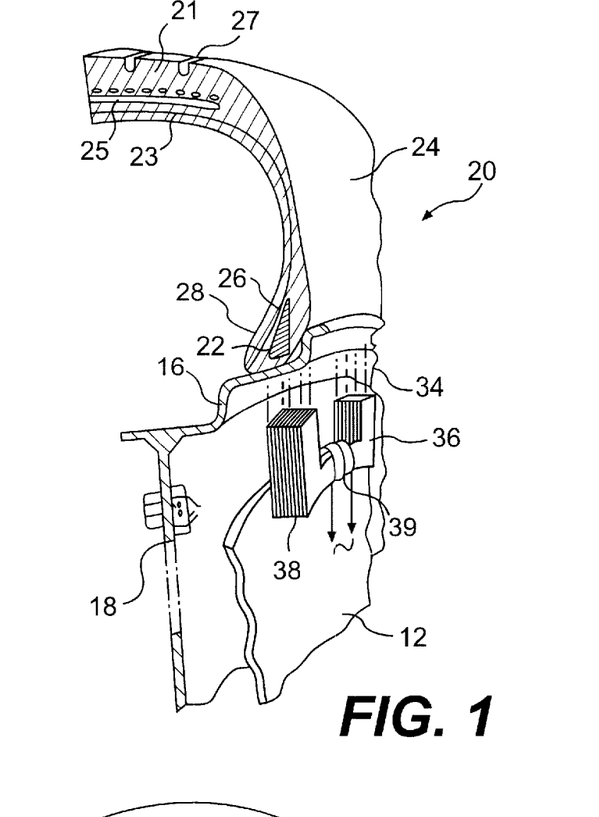
FIG. 1 is a partial perspective sectional view of a tire mounted on a motor vehicle wheel rim and comprising the current generator according to the present invention.

With reference to FIG. 1, a tire 20 comprises a carcass of toroidal form, which has a central crown portion 21 from whose edges two axially opposing sidewalls 24 extend radially inwards and terminate in annular areas of high rigidity 28, usually known as beads, each of these being reinforced with at least one inextensible annular reinforcing core 22, usually known as a bead core.

The supporting structure of the said carcass comprises at least one reinforcing ply 23, each of whose opposing lateral flaps is fixed to a corresponding bead core 22, for example by wrapping it from the inside outward around the said bead core. On the outer peripheral edge of each bead core there is usually applied an annular elastomeric filling 26, of substantially triangular section, usually called the "bead filler", which occupies the space formed between the reinforcing ply and the corresponding wrapped around lateral flap.

As already stated, the axially opposing areas of the tire comprising the said bead cores 22 and their bead filler 26 form what are known as beads, each of which is indicated as a whole by the number 28, and which are intended for fixing the tire 20 on the corresponding mounting rim 16 of a vehicle wheel.

A belt structure 25, comprising two or more strips of rubberized fabric made from textile or metal cords incorporated in a sheet of compound, may be associated coaxially with the said carcass structure.

On the crown portion of the carcass, or on the belt structure 25 if present, there is applied a tread band 27, which extends axially in a continuous way between the said sidewalls, and by means of which the tire 20 makes contact with the ground. The tread band 27 comprises a plurality of recesses and grooves which delimit a corresponding plurality of strips and/or blocks, the whole forming a tread pattern.

The tire structure described above has been well known for some time to those skilled in the art, and it is therefore unnecessary to add further details; it is also known that this structure may comprise many other structural members such as bead reinforcing edges, filling strips under the edges of the belt, waterproofing liners on the carcass ply in a radially inward position, and others, according to the specific type of tire in question.

Figure 2:
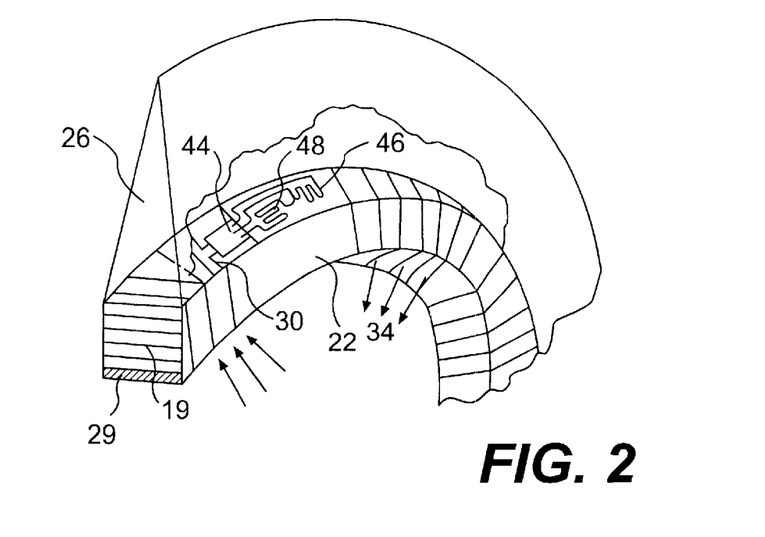
FIG. 2 is a partial view of the assembly to be inserted in the bead of a tire.

With reference to FIG. 2, an electrical current generator according to the invention includes a secondary inductive element which comprises the bead core 22 as the ferromagnetic core, and at least one winding 30 of conducting wire, comprising at least one turn wound on the said core, to form the said secondary inductive element. This secondary inductive element (illustrated in FIG. 2 in the version with only one winding on the bead wire) constitutes the moving (rotating) portion of the current generator according to the invention.

During operation, the said secondary inductive element is linked to a magnetic field 34 generated by a primary inductive element comprising at least one magnet, preferably an electromagnet 36 provided with a core 38 covered by an excitation winding 39. The electromagnet 36 is fixed to a support 12 mounted on the hub of the wheel, and constitutes the fixed portion of the current generator according to the invention.

The bead wire 22 generally consists of the winding of a wire or of a group of wires adjacent to each other, or alternatively a steel strip 19, wound spirally in a certain number of radially superimposed layers; the material of the wire or of the strip 19 normally has good mechanical properties, having preferably a breaking load of at least 500 MPa (megapascals) and a breaking strain of at least 3%.

Preferably, in order to increase the magnetic properties of the said material, the said winding comprises, preferably in a radially inner and/or outer position, a layer of material with high magnetic permeability, preferably not less than 5000 Gs/Oe (gauss/oersted), such as an amorphous metal alloy.

Alternatively, the layer of material with high magnetic permeability may advantageously be divided into a number of parts, for example when it has a breaking strain of less than 3%, and in particular when its ductility is insufficient to withstand the possible deformations of the bead core, especially at the time of mounting of the cover on the rim.

According to yet a further alternative, the bead core 22 consists of a winding of fibres or yarn or cords having at least tensile strength, preferably textile cords having a modulus equal to or greater than 50 GPa (gigapascals) and a breaking load equal to or greater than 500 MPa, for example those made from Kevlar® (registered trade mark of DuPont), incorporated in a matrix, preferably based on elastomeric material, containing ferromagnetic material in the form of powder or fibrils, or combined with a layer of material with high magnetic permeability as defined above.

Preferably, only one of the bead cores 22 of the tire 20, hereinafter termed a "coil bead core", is prepared to form the said secondary inductive element, and, even more preferably, the tire 20 is assembled on to the mounting rim 16 with the bead 28 provided with this bead core 22 mounted on the axially inward side, in other words on the vehicle side.

Still with reference to FIG. 2, the voltage developed periodically across the terminals of the winding 30 can be used to supply electronic circuits and sensors of the condition and/or operation of the tire. According to the invention, this voltage is preferably applied to an electronic data sensing and transfer device 44, comprising microcircuits connected to sensors of conditions of the tire, for example extensometers which sense the deformations of the bead core, or sensors of temperature and/or pressure. By way of example, FIG. 2 shows two extensometers 46, 48, otherwise known as "strain-gauge transducers", mounted in two directions orthogonal to each other to constitute a conventional temperature-compensated bridge means; this pair of extensometers constitutes a sensor of the longitudinal deformation of the bead core from which the effects of temperature variation have been eliminated. FIG. 2 does not show temperature sensors, since these are conveniently integrated in the electronic device 44.

Where the primary inductive element is concerned, the winding 39 of the electromagnet 36 is preferably supplied with alternating current to enable the winding 30 to generate a supply current both when the wheel 18 is stationary and when the said wheel is in motion. The power supply frequency is preferably chosen in such a way as to permit an effective induced signal in the winding 30 to supply the electronic device 44.

The power supply frequency may, for example, lie within the range from 3 kHz to 30 kHz, and is preferably of the order of 10 kHz. The power supplied is of the order of a few watts (approximately 3 W), and can be used to supply circuits with a consumption of the order of approximately 10 mW.

The winding 39 is excited by means of a direct to alternating current converter, supplied from the electrical system of the vehicle, and not shown in the figures since it is not relevant for the purposes of the invention.

FIG. 2 shows a first preferred example of an embodiment of the invention. In this example, the bead core 22 consists of a steel strip 19, with a breaking load of more than 1700 MPa and a section of 6×0.7 mm, wound spirally on itself to form 5 radially superimposed layers.

In a radially inward position from this bead wire 22 there is wound, along the whole circumferential development of the bead core, a layer 29, as wide as the strip 19 and having a thickness of 1.5 mm, consisting of 30 turns of Fe81B14Si3C2 amorphous metal alloy (metallic glass) having a thickness of 50 μm, to form a bead wire with characteristics of high magnetic permeability.

Figure 3:
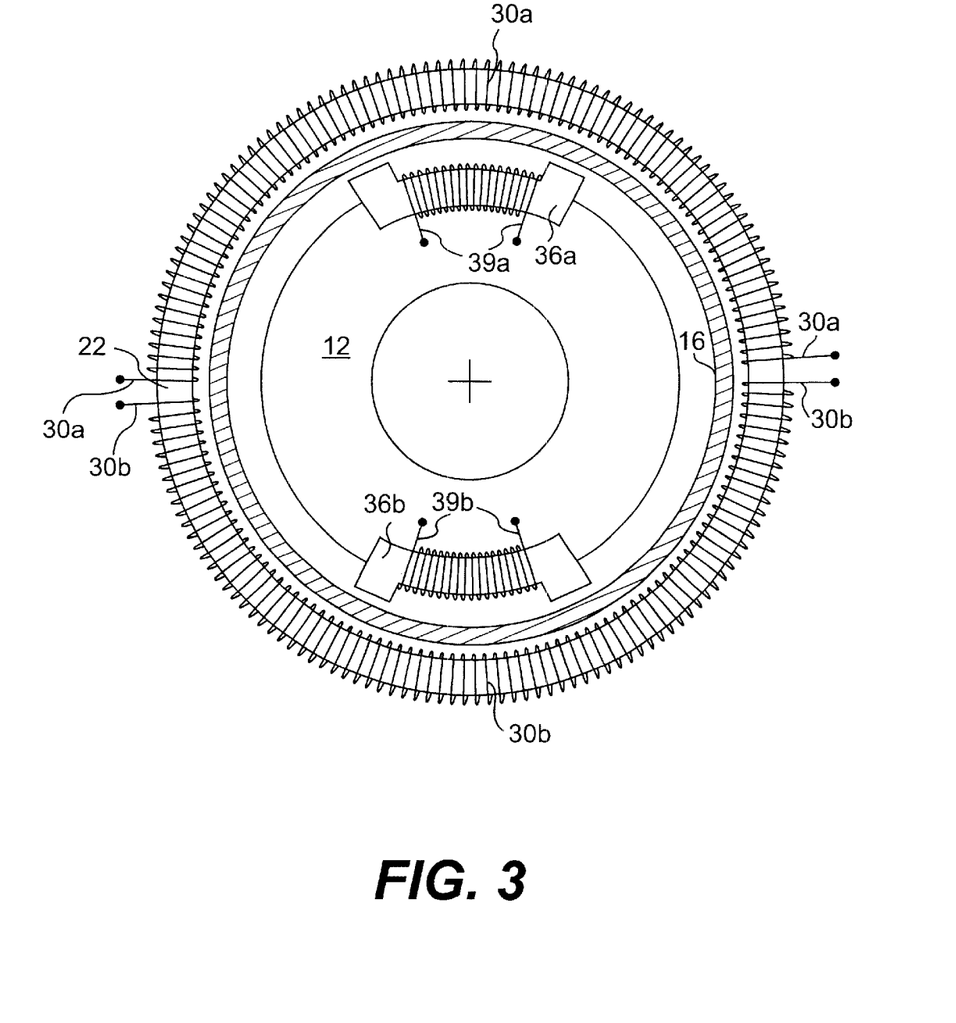
FIG. 3 is a partial view, on the plane perpendicular to the axis of rotation, of an example of a current generator according to the invention (in a version with two magnets and two windings on the bead wire)

Two windings 30a and 30b are disposed around this bead core (FIG. 3). Each of the said windings is preferably formed by a winding of enamelled copper wire, with a diameter of 2 mm, wound around the transverse profile of the bead core 22 with adjacent turns disposed with a linear density of 2 turns/mm. Two electromagnets 36a and 36b, mounted on the fixed part of the wheel hub, and disposed at 180° to each other, face the windings 30a and 30b in turn during one revolution of the wheel.

Each of the electromagnets 36a and 36b, which are integral with the hub, consists of a core 38 of substantially C-shaped ferromagnetic material, with the opening facing the bead core 22, and provided with a winding 39a and 39b respectively, made with enamelled copper wire with a diameter of 2 mm through which an alternating current passes so that it acts as a primary inductive element of a generator, rotating with respect to the windings 30a and 30b on the bead core, which act as secondary inductive elements of the said generator, thus providing a supply to the electronic device 44 which monitors the state of the tire both when the wheel is stationary and when the wheel is in motion.

This embodiment with the electromagnets 36a and 36b supplied with alternating current, preferably at a frequency of 10 kHz, produces in the secondary inductive element a particularly efficient, continuous and uniform generation of power which can be used to supply the electronic device 44 for sensing and transfer of data. If the circumferential distance between the windings 30a and 30b is small, as shown in FIG. 3, the jointly generated voltage is virtually constant; if this distance is sufficiently large, there will be two brief interruptions in the supply in each revolution, making it possible to incorporate a precision tachometer in the electronic device 44.

The impedance of each winding is approximately half that of a single winding, as described previously, but this is accompanied by a greater structural complexity; the choice between the two solutions preferably depends on the electrical characteristics of the circuits of the electronic device 44.

Preferably, the number of windings 30 on the bead core 22 will lie in the range from 1 to 8 and the fraction of the circumference of the bead core covered by the winding or windings will lie in the range from 1/10 to 10/10. The total number of turns of all the windings preferably lies in the range from 500 to 5000.

The number of magnets of the primary inductive element also preferably lies in the range from 1 to 8. The general configuration of the system (the number and length of the windings) depends on the requirements of the user circuits, in particular on whether an uninterrupted power supply is required or whether operation for only a fraction of the period of revolution of the wheel is possible. The simplest design is that consisting of a single winding over the whole of the bead core, with a single primary electromagnet 36, preferably integral with the hub of the wheel, which enables the movements transmitted to the tire by the steering and suspension to be followed while the distance, preferably lying in the range from 1 mm to 10 mm, between the primary electromagnet 36 and the adjacent surface of the rim 16 is kept substantially unchanged.

The solution with the single winding is preferred in cases in which the rather high impedance of such a circuit does not adversely affect the operation of the system.

In a different alternative embodiment, a single secondary winding 30 is excited by two or more primary electromagnets 36: this solution is advantageous when, for reasons related to the configuration of the suspension of the vehicle, it is preferable to install a plurality of low-power magnets instead of a single more powerful and larger magnet.

Figure 6:
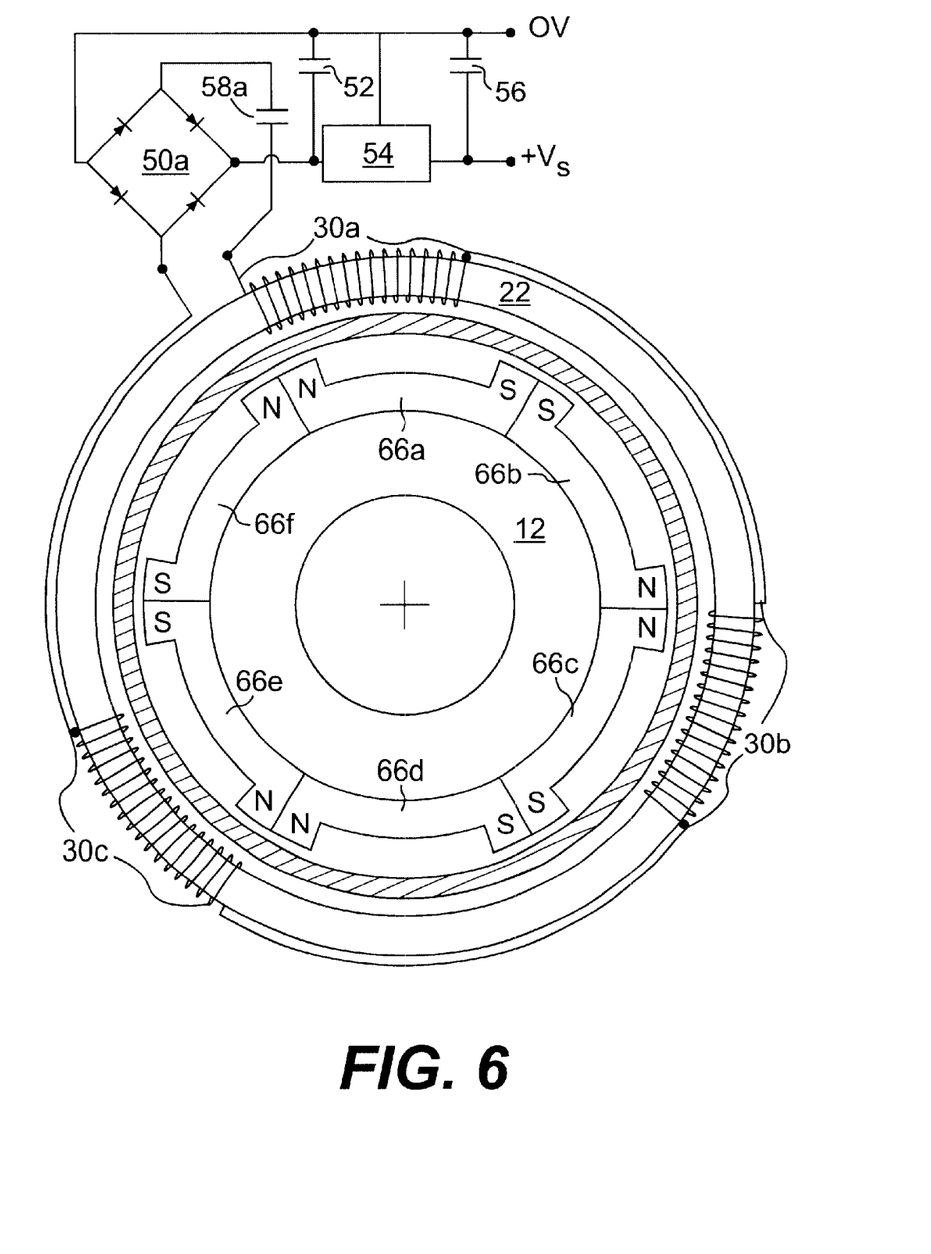
FIG. 6 shows, in the same view as that of FIG. 3, an example of the embodiment of the generator in the version provided with permanent magnets, which is therefore capable of operating only when the wheel is in motion.

In another preferred embodiment of the invention, the magnets are electromagnets 36 supplied with direct current or permanent magnets (66a–66f in FIG. 6).

In this way the electronic device 44 is supplied only when the wheel is in motion, but this has the advantage of providing an additional indication which can determine the speed of rotation of the wheel.

With reference to FIG. 6, an example of a configuration intended to operate only with the wheel in motion is shown, and comprises permanent magnets 66a–66f, preferably consisting of samarium-cobalt or iron-neodymium-boron sintered alloy.

In the example illustrated, the bead core 22 carries a number of windings equal to 3, in other words 30a, 30b and 30c, connected in series, the length of each being less than 1/6 of the circumference. The windings may be made from a single enamelled copper wire with a diameter of the order of 2 mm and a number of turns of the order of 3000.

The circuit constructed according to this example is therefore particularly simple, since, although the system is provided with three secondary windings, it requires only one rectifier bridge 50a with the corresponding capacitors. The primary inductive element consists of 6 C-shaped permanent magnets, 66a, 66b, 66c, 66d, 66e, 66f, mounted side by side, so that there is an alternation of North and South pole extensions, and fixed on the support 12 which is integral with the hub of the wheel 18. Since the assembly of three secondary windings connected in series is equivalent to a circuit formed by a single winding, the printed circuit mounted on the bead core in this example is equivalent to that which will be described subsequently with reference to FIG. 5.

Alternatively, the permanent magnets may be replaced with electromagnets having windings supplied with direct current from the electrical system of the vehicle.

The preferred configuration for this alternative type of generator is that in which the circumference of the bead core is divided into 2 N equal arcs and N said arcs, for example the odd-numbered ones, each have a winding formed on them and connected in series. It should be noted that each of the N arcs is not necessarily completely covered by the winding; in fact, it is advantageous to concentrate the turns on a fraction of the length of each of the said arcs. The preferred method of achieving this is to form the windings from a single enamelled copper wire, in such a way that the connection in series is created without the need to use joints, soldering or connectors. Alternatively, one or more of the wires used to form the secondary windings may be made with other appropriate materials having an adequate cross-section. For example, aluminium wires or conducting polymers may be used.

In order to increase the available power, it is also possible to form on the bead core a plurality of windings connected in series, as described above, with each winding having its own rectification and control circuit. 2 N C-shaped permanent magnets, consisting for example of samarium-cobalt or iron-neodymium-boron alloy which is sintered or in the form of a powder incorporated in an organic or ceramic matrix, disposed in the sequence North-South, South-North, North-South, and so on, thus forming an alternation of south and north magnetic poles, are mounted on a circular support which is integral with the hub. Alternatively, all these magnets may be replaced with a single ring magnet with N north pole extensions and N south pole extensions alternating with each other. If necessary, the system may have a number of pairs of poles smaller than N, with only partial coverage of the circumference; such a configuration, which is clearly lighter than the full configuration, will be capable of supplying a lower electrical power than the latter, but without adverse effects on the continuity of the power generation during the revolution of the wheel, unlike what would happen if the number of windings of the secondary were also less than that required to bring the whole circumference into operation.

It should be noted that the example illustrated in FIG. 6 is provided solely for guidance, since a simple and easily read diagram is required. In reality, given the sizes of the rims and the space in which the magnets can be disposed, it is preferable to use a number 2 N of permanent magnets 66 lying in the range from 20 to 60, in combination with N windings, particularly in order to increase the operating frequency of the system at low rotation speeds of the wheel, in such a way as to increase the induced flux and to reduce the capacitance, and consequently the size, of the capacitors used.

In a further alternative embodiment, the magnets are electromagnets, one or more of which can be supplied with a combination of alternating current superimposed on a direct current, thus providing a current with two harmonic components, one at the frequency of the alternating current of the primary (the reference frequency) and the other at a frequency equal to n times the inverse of the period of revolution of the wheel. This enables the circuits present in the cover to distinguish between the state with the wheel stationary and the state with the wheel in motion, and to determine extremely precisely the speed of rotation of the wheel, by deducing it from the ratio between the two frequencies, without the need to use a reference frequency, such as that provided by a quartz oscillator, which would be necessary if the same result were required from permanent magnets or from electromagnets supplied with direct current.

Figure 4:
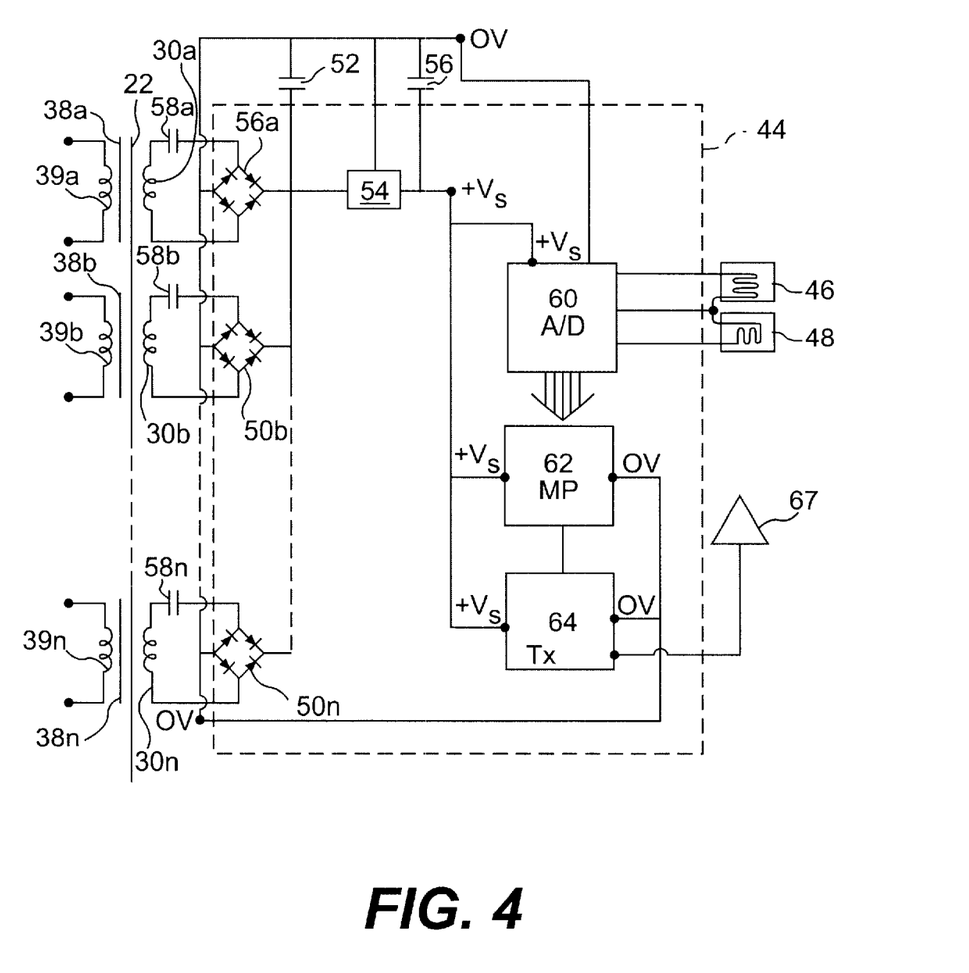
FIG. 4 is a diagram, partially of the circuit diagram type and partially of the block diagram type, of the supply current generator and of devices for sensing tire parameters and transmitting the measurements obtained.

With reference now to FIG. 4, according to the invention this shows a preferred embodiment of an electronic device 44 for sensing and transferring data, advantageously supplied by the current generator according to the present invention.

Figure 5:
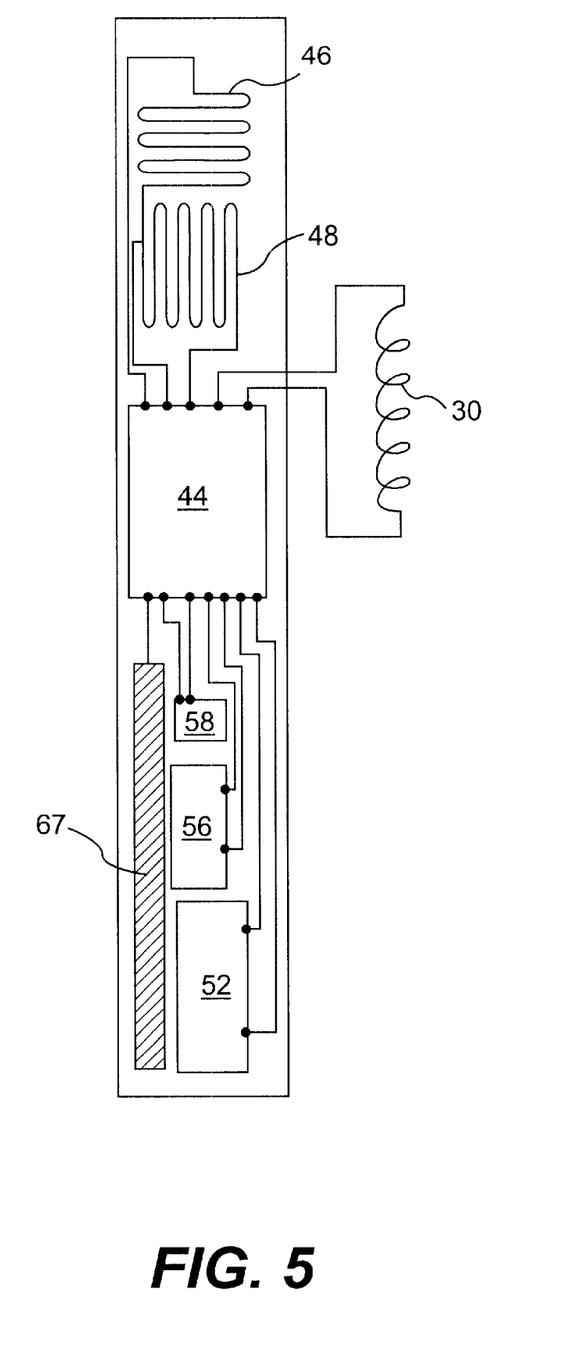
FIG. 5 shows an example of a possible mechanical configuration of the whole electronic system, mounted on a single flexible printed circuit.

The portion of the figure enclosed by the broken line corresponds to a conventional highly integrated electronic device 44, shown in FIG. 5.

The said device is electrically connected to the windings 30a, 30b, . . . , 30n present on the bead core 22, coupled inductively to the windings 39a, 39b, . . . , 39n present on the ferromagnetic core 38a, 38b, . . . , 38n of the electromagnets 36a, 36b, . . . , 36n.

These windings 30a–30n are connected to rectifier bridges 50a, 50b, . . . , 50n respectively (through corresponding capacitors 58a, 58b, . . . , 58n) whose capacitance is such that the resonant frequency of the oscillating circuit is tuned to that of the supply to the electromagnets 36a, 36b, . . . , 36n which supply (if necessary through a resistor not shown in the figure) a first filter capacitor 52, a voltage stabilizing circuit 54 and preferably also a second filter capacitor 56, thus producing a continuous supply voltage at the power supply terminals marked 0V and VS. This continuous supply voltage is used to supply the remaining circuits of the electronic device 44.

The electronic device 44 comprises, in addition to the rectifier bridges 50 and the stabilizer circuit 54, an analog/digital (A/D) converter 60 which converts the analog signals supplied by the sensors 46 and 48 to digital data to be sent to a microprocessor 62 for the processing of the acquired data and for the control of the transmission protocol, a radio transmitter 64 which drives a transmission antenna 67 to send the messages to computers or instruments having display devices, mounted for example on the dashboard of the vehicle, or to other equipment.

The circuit in FIG. 4 also comprises the previously mentioned extensometers 46 and 48, connected by means of a Wheatstone bridge.

Preferably, the electronic device 44, the sensors 46 and 48, the capacitors 52, 56 and 58, and the transmission antenna 67 are mounted on a printed circuit formed from a suitable insulating material such as those known by the trade names Makrolon®, Teflon® or Kapton®.

The transmission antenna 67 may advantageously be formed by a suitable track of the said printed circuit.

Preferably, this printed circuit is adhesively bonded or otherwise fixed to the bead core 22, more preferably on its radially outer surface, before the filler 26 is added to the bead core.

A possible physical configuration of the said printed circuit is shown in FIG. 5, for the case of a single secondary winding around the bead core.

It is important to note that, within the scope of the present invention, it is possible to use for the data transmission many other solutions known per se within the field of data transmission without galvanic contact.

For example, as an alternative to the radio transmitter 64, of the conventional or Direct Sequence Spread Spectrum (DSSS) type, it is possible to use sub-systems which transmit the stream of digital data through the same magnetic coupling which is used for power transmission between the primary magnet and the secondary winding.

Transmission may be carried out, for example, by modulating the impedance of the secondary winding, or by transmitting an alternating-current signal, at a frequency different from that of the primary electromagnet, in such a way as to transfer the encoded signals of the parameters of the tire 20 to a suitable receiver connected to a display unit mounted on the dashboard of the motor vehicle.

The layout of the data sensing and transfer device shown in FIG. 4 is only one preferred circuit among the possible ones which may be constructed for this purpose; with a knowledge of the invention, persons skilled in the art will not find it difficult to produce alternative circuits which can best meet their requirements.

Conventionally, the tire manufacturing process, or more precisely the process of assembling the semi-finished products, comprises two successive stages, which will be mentioned only briefly since they are already known. Reference may be made, for example, to European patent EP 433 974.

In the first stage, the carcass is prepared in the form of a cylindrical sleeve, without belts and tread band, by winding a carcass ply on a suitable building drum, preferably of the rigid and collapsible type. Conventionally, the reinforcing bead cores 22 are produced separately and are preferably combined in advance with the corresponding filler 26. A pair of these bead cores 22 is then attached to the carcass by fixing the edges of the ply to the said bead cores 22, after which the sidewalls 24 of the tire 20 are also applied to the sleeve. In the second stage, the sleeve is shaped into a toroid on a suitable expandable shaping drum, and the belt structure 25 and the tread band 27, preferably pre-assembled separately on a special auxiliary building drum, are applied to its crown. All the semi-finished products required for making the green carcass are supplied to the tire building machine by feed devices associated with it.

These two stages may be carried out on the same tire building machine or on two separate machines, one for the first stage and one for the second; for the purposes of the present invention, two separate machines will be treated as if they formed a single tire building machine.

For the purposes of the production process of a tire 20, the provision of a bead core 22 according to the present invention does not require significant modifications to the various stages of production briefly described above. In particular, it is possible to modify only the stage of production of the bead core 22, while leaving unchanged the production cycle of the assembly of the various semi-finished products.

In a first example, in order to produce a bead core of the type described with reference to FIGS. 3 and 5, when the bead core 22 has been produced in a conventional way, two solenoids 30a and 30b, of 2 mm diameter enamelled copper wire, are wound on a portion of the bead wire, around its transverse profile.

Each solenoid covers, with adjacent turns having a linear density of 2 turns/mm, a different half of the circumference of the bead core 22. The solenoids 30a and 30b thus produced are connected together in series. The terminals of the series winding are connected to the electronic device 44 to supply it with power.

The printed circuit, comprising the transmission antenna 67, the electronic device 44, the sensors 46 and 48 and the capacitors 52, 56 and 58, is fixed to the bead wire 22, for example with adhesive.

When the formation of the windings and the application of the printed circuit have both been completed in a conventional way, the bead filler 26 is attached to the bead core 22.

In a different example of production, the bead wire 22 consists of a winding of 5 turns of steel strip 19 with a breaking load of more than 1700 MPa and a cross section of 6×0.7 mm. Next, before the conducting wire windings 30a and 30b are applied, 30 turns of Fe81B145Si3C2 alloy (metallic glass) strip, having a section of 50 $\mu$m, thus producing a total of 1.5 mm, are disposed along the whole circumferential development of the bead core in a radially outward or inward position, to form a layer 29 of material with high magnetic permeability on the said bead core 22.

This latter alternative is in any case preferable where the bead core 22 is formed by windings of fibres and yarns with low magnetic permeability, for example those made from Kevlar®.

Alternatively, in place of the turns of amorphous alloy strip, in order to avoid the risk of breakage of a continuous layer of material which has a low breaking strain, usually less than 3%, the said layer may conveniently be divided into a plurality of small blocks adhesively bonded around the circumference of the bead core.

For the purposes of the present invention, reference to a conducting element or one having good mechanical properties or having high or low magnetic permeability have meant an element which has physical characteristics considered appropriate by a person of average skill in the art.

Preferably "conducting material" signifies a material having a conductivity of at least 10 S/cm (siemens/cm); "material with good mechanical properties" signifies a material which withstands a breaking load of at least 500 mpa and has a breaking strain of at least 3%; and "material with high magnetic permeability" signifies a material with magnetic permeability "$\mu$ max" of at least 5000 Gs/Oe.

What is claimed is:

1. A tire for a vehicle wheel, comprising:
   a toroidal carcass;
   a tread band; and
   a first inductive element of an electrical generator;
   wherein the toroidal carcass comprises a pair of axially-opposing sidewalls terminating in beads allowing mounting of the tire on a corresponding rim,
   wherein the tread band is disposed on a crown of the toroidal carcass and axially extends continuously between the sidewalls,
   wherein at least one of the beads comprises an annular core comprising a steel strip spirally wound to form at least two radially-superposed layers, and
   wherein the first inductive element comprises at least one turn of conducting wire wound around a transverse profile of the annular core.

2. The tire of claim 1, wherein the annular core further comprises one or more layers comprising a material with high magnetic permeability.

3. The tire of claim 2, wherein at least one of the layers comprising the material with high magnetic permeability is divided into more than one part.

4. The tire of claim 1, further comprising at least one device electrically connected to the first inductive element.

5. The tire of claim 1, further comprising at least one electronic circuit operatively coupled to the first inductive element.

6. The tire of claim 5, wherein the at least one electronic circuit comprises means for sensing one or more parameters associated with the tire.

7. The tire of claim 6, wherein the sensing means comprises at least one temperature sensor, at least one pressure sensor, or at least one temperature sensor and at least one pressure sensor.

8. The tire of claim 6, wherein the sensing means comprises a pair of extensometers oriented perpendicularly to each other to sense deformations of the annular core.

9. The tire of claim 5, wherein the at least one electronic circuit is fixed to the annular core.

10. The tire of claim 6, wherein the at least one electronic circuit comprises means for transmitting information related to at least one of the one or more parameters associated with the tire.

11. The tire of claim 1, wherein the first inductive element can be associated with at least one second inductive element to form the electrical generator, and
    wherein the first inductive element is movable with respect to the second inductive element.

12. A tire for a vehicle wheel, comprising:
    a toroidal carcass;
    a tread band; and
    a first inductive element of an electrical generator;
    wherein the toroidal carcass comprises a pair of axially-opposing sidewalls terminating in beads allowing mounting of the tire on a corresponding rim,
    wherein the tread band is disposed on a crown of the toroidal carcass and axially extends continuously between the sidewalls,
    wherein at least one of the beads comprises an annular core comprising a matrix based on an elastomeric material or a plastomeric material,
    wherein the matrix incorporates fibers, yarn, or cords, and contains ferromagnetic material in at least one of a powder form or a fibril form, and
    wherein the first inductive element comprises at least one turn of conducting wire wound around a transverse profile of the annular core.

13. The tire of claim 12, wherein the annular core further comprises one or more layers comprising a material with high magnetic permeability.

14. The tire of claim 13, wherein at least one of the layers comprising the material with high magnetic permeability is divided into more than one part.

15. The tire of claim 12, further comprising at least one device electrically connected to the first inductive element.

16. The tire of claim 12, further comprising at least one electronic circuit operatively coupled to the first inductive element.

17. The tire of claim 16, wherein the at least one electronic circuit comprises means for sensing one or more parameters associated with the tire.

18. The tire of claim 17, wherein the sensing means comprises at least one temperature sensor, at least one pressure sensor, or at least one temperature sensor and at least one pressure sensor.

19. The tire of claim 17, wherein the sensing means comprises a pair of extensometers oriented perpendicularly to each other to sense deformations of the annular core.

20. The tire of claim 16, wherein the at least one electronic circuit is fixed to the annular core.

21. The tire of claim 17, wherein the at least one electronic circuit comprises means for transmitting information related to at least one of the one or more parameters associated with the tire.

22. The tire of claim 12, wherein the first inductive element can be associated with at least one second inductive element to form the electrical generator, and
    wherein the first inductive element is movable with respect to the second inductive element.

23. A tire for a vehicle wheel, comprising:
    a toroidal carcass;
    a tread band;
    a first inductive element of an electrical generator; and
    at least one device electrically connected to the first inductive element;
    wherein the toroidal carcass comprises a pair of axially-opposing sidewalls terminating in beads allowing mounting of the tire on a corresponding rim, wherein the tread band is disposed on a crown of the toroidal carcass and axially extends continuously between the sidewalls, wherein each of the beads comprises an annular core, and wherein the first inductive element comprises at least one turn of conducting wire wound around a transverse profile of one of the annular cores.

24. A tire for a vehicle wheel, comprising:

a toroidal carcass;

a tread band;

a first inductive element of an electrical generator; and at least one electronic circuit operatively coupled to the first inductive element;

wherein the toroidal carcass comprises a pair of axially-opposing sidewalls terminating in beads allowing mounting of the tire on a corresponding rim, wherein the tread band is disposed on a crown of the toroidal carcass and axially extends continuously between the sidewalls, wherein each of the beads comprises an annular core, and wherein the first inductive element comprises at least one turn of conducting wire wound around a transverse profile of a first annular core.

25. The tire of claim 24, wherein the first annular core further comprises one or more layers comprising a material with high magnetic permeability.

26. The tire of claim 25, wherein at least one of the layers comprising the material with high magnetic permeability is divided into more than one part.

27. The tire of claim 24, wherein the at least one electronic circuit comprises means for sensing one or more parameters associated with the tire.

28. The tire of claim 27, wherein the sensing means comprises at least one temperature sensor, at least one pressure sensor, or at least one temperature sensor and at least one pressure sensor.

29. The tire of claim 27, wherein the sensing means comprises a pair of extensometers oriented perpendicularly to each other to sense deformations of the first annular core.

30. The tire of claim 24, wherein the at least one electronic circuit is fixed to the first annular core.

31. The tire of claim 27, wherein the at least one electronic circuit comprises means for transmitting information related to at least one of the one or more parameters associated with the tire.

32. The tire of claim 24, wherein the first inductive element can be associated with at least one second inductive element to form the electrical generator, and wherein the first inductive element is movable with respect to the second inductive element.

33. A system for sensing and signaling one or more parameters associated with a tire for a vehicle wheel, comprising:

a tire, comprising:
 a toroidal carcass;
 a tread band; and
 a first inductive element;
 wherein the toroidal carcass comprises a pair of axially-opposing sidewalls terminating in beads allowing mounting of the tire on a corresponding rim,
 wherein the tread band is disposed on a crown of the toroidal carcass and axially extends continuously between the sidewalls,
 wherein each of the beads comprises an annular core, and wherein the first inductive element comprises at least one turn of conducting wire wound around a transverse profile of one a first annular core;

a device for sensing one or more parameters associated with the tire; and an electrical generator for providing power to the sensing device.

34. The system of claim 33, wherein at least one of the annular cores comprises a steel strip spirally wound to form at least two radially-superposed layers.

35. The system of claim 33, wherein at least one of the annular cores comprises a matrix based on an elastomeric material or a plastomeric material, and wherein the matrix incorporates fibers, yarn, or cords, and contains ferromagnetic material in at least one of a powder form or a fibril form.

36. The system of claim 33, wherein the first inductive element can be associated with at least one second inductive element to form the electrical generator, and wherein the first inductive element is movable with respect to the second inductive element.

37. The system of claim 36, wherein the at least one second inductive element comprises at least one permanent magnet.

38. The system of claim 36, wherein the at least one second inductive element comprises at least one electromagnet and at least one turn of conducting wire wound around a transverse profile of one of the at least one electromagnet to form at least one winding of the electrical generator.

39. The system of claim 38, wherein the at least one electromagnet is supplied with direct current.

40. The system of claim 38, wherein the at least one electromagnet is supplied with alternating current.

41. The system of claim 38, wherein the at least one electromagnet is supplied with direct current and alternating current.

42. A method for producing a tire, comprising the steps of:

producing semi-finished components for building a tire;

forming a first inductive element of an electrical generator; and assembling the semi-finished components;

wherein the tire comprises a pair of ferromagnetic annular cores allowing mounting of the tire on a corresponding rim, and wherein the step of forming the first inductive element comprises winding at least one turn of conducting wire around a transverse profile of at least one of the annular cores.

43. The method of claim 42, wherein at least one of the annular cores comprises a steel strip spirally wound to form at least two radially-superposed layers.

44. The method of claim 42, wherein at least one of the annular cores comprises a matrix based on an elastomeric material or a plastomeric material, and wherein the matrix incorporates fibers, yarn, or cords, and contains ferromagnetic material in at least one of a powder form or a fibril form.

45. The method of claim 42, wherein the first inductive element can be associated with at least one second inductive element to form the electrical generator, and wherein the first inductive element is movable with respect to the second inductive element.

46. The method of claim 42, further comprising the step of fixing means for sensing one or more parameters associated with the tire to a respective annular core, wherein the electrical generator provides power to the sensing means.

47. The method of claim 42, further comprising the step of layering a material with high magnetic permeability on at least one of the annular cores, wherein the step of layering the material with high magnetic permeability is completed before the step of forming the first inductive element is completed.

* * * * *

UNITED STATES PATENT AND TRADEMARK OFFICE
CERTIFICATE OF CORRECTION

PATENT NO.    : 6,470,933 B1  Page 1 of 1
DATED         : October 29, 2002
INVENTOR(S)   : Alessandro Volpi It is certified that error appears in the above-identified patent and that said Letters Patent is hereby corrected as shown below:

<u>Title page, Item [54], and Column 1, line 6,</u>
In the title, "MANUFACTURE" should read -- MANUFACTURING --.

Signed and Sealed this

Twenty-fifth Day of March, 2003

JAMES E. ROGAN
*Director of the United States Patent and Trademark Office*